United States Patent
Nagata et al.

(10) Patent No.: US 8,284,169 B2
(45) Date of Patent: Oct. 9, 2012

(54) DISPLAY DEVICE

(75) Inventors: Hisashi Nagata, Matsusaka (JP); Toshihiro Yanagi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1143 days.

(21) Appl. No.: 11/997,342

(22) PCT Filed: Aug. 30, 2006

(86) PCT No.: PCT/JP2006/317107
§ 371 (c)(1), (2), (4) Date: Jan. 30, 2008

(87) PCT Pub. No.: WO2007/026764
PCT Pub. Date: Mar. 8, 2007

(65) Prior Publication Data
US 2010/0090975 A1  Apr. 15, 2010

(30) Foreign Application Priority Data
Sep. 1, 2005 (JP) .................. 2005-253223

(51) Int. Cl.
*G06F 3/044* (2006.01)
(52) U.S. Cl. ........................ 345/174; 345/173
(58) Field of Classification Search .......... 345/173, 345/174, 206, 209; 349/139
See application file for complete search history.

(56) References Cited

U.S. PATENT DOCUMENTS

| | | | |
|---|---|---|---|
| 5,677,744 A | | 10/1997 | Yoneda et al. |
| 6,057,903 A | * | 5/2000 | Colgan et al. ........... 349/139 |
| 6,876,355 B1 | * | 4/2005 | Ahn et al. ............... 345/173 |
| 2003/0122801 A1 | * | 7/2003 | Yu ........................... 345/173 |
| 2004/0217945 A1 | * | 11/2004 | Miyamoto et al. ...... 345/173 |
| 2010/0328256 A1 | * | 12/2010 | Harada et al. ........... 345/174 |

FOREIGN PATENT DOCUMENTS

| | | |
|---|---|---|
| JP | 59-9326 U | 1/1984 |
| JP | 61-174587 A | 8/1986 |
| JP | 2003-066417 A | 3/2003 |

OTHER PUBLICATIONS

Official communication issued in the International Application No. PCT/JP2006/317107, mailed on Dec. 26, 2006.

* cited by examiner

*Primary Examiner* — Quan-Zhen Wang
*Assistant Examiner* — Yuk Chow
(74) *Attorney, Agent, or Firm* — Keating & Bennett, LLP

(57) ABSTRACT

A liquid crystal display device includes an active matrix substrate, a counter substrate, a liquid crystal layer arranged between the active matrix substrate and the counter substrate and a capacitive touch panel. The counter substrate is thinner than the active matrix substrate and the capacitive touch panel is arranged on the surface of the active matrix substrate opposite the liquid crystal layer.

9 Claims, 7 Drawing Sheets

DISPLAY DEVICE

BACKGROUND OF THE INVENTION

1. Summary of the Invention

The present invention relates to a display device, in particular a touch panel display device.

2. Description of the Related Art

In recent years, display devices equipped with touch panels (touch panel display devices) have widely been used (see, for example, Japanese Unexamined Patent Publication No. S61-174587 and Japanese Unexamined Patent Publication No. 2003-66417).

The touch panels are classified into various types, such as resistive, capacitive (see, for example, Japanese Unexamined Patent Publication No. 2003-66417), infrared, ultrasonic and electromagnetic inductive touch panels depending on the operation principles. Among them, it has been known that the capacitive touch panels are suitable for display devices because they are relatively less likely to impair optical properties of the display devices.

In general, a capacitive touch panel includes a position sensing transparent electrode arranged to cover a display panel, a plurality of electrode terminals provided on the periphery of the position sensing transparent electrode and a current sensing circuit for sensing currents flowing through the electrode terminals. When a user touches the touch panel, the position sensing transparent electrode is grounded at the touched part via capacitance of a human body. As a result, a value of resistance between the electrode terminals and the grounded part is varied. Then, the variation of the resistance value is sensed by the current sensing circuit to detect the touched position.

In recent years, the display devices including the touch panel display devices are required to be thin and light. In general, an active matrix substrate is formed to protrude over a counter substrate and external circuits such as driver IC chips are mounted on the protruding portion of the active matrix substrate. Therefore, in view of strength of the assembled device and durability to the mounting of the external circuits, the active matrix substrate is formed to be thick enough to ensure the strength of the display device and the durability of the mounting of the external circuit, while the counter substrate is thinned down as much as possible. As disclosed in Japanese Unexamined Utility Model Publication No. 59-9326, this has been a general way to reduce the thickness and weight of the display devices.

The thin counter substrate has been used in conventional thin and light touch panel display devices along with the above-described technical idea. Further, for the purpose of taking light out with high efficiency, the display device is configured to take out light passed through a liquid crystal layer via a counter electrode and the touch panel is arranged on the side of the display device close to the counter electrode.

The conventional capacitive touch panel display device including the touch panel arranged on the counter substrate side has a problem in that the position sensing cannot be performed with high accuracy.

SUMMARY OF THE INVENTION

In order to solve the problems described above, preferred embodiments of the present invention provide a touch panel display device which performs position sensing with high accuracy.

As a result of close study, the inventors of the present invention have found that when the capacitive touch panel is arranged on the side of the display panel close to the thin counter substrate, large capacitance is generated between the capacitive touch panel and the counter electrode and the capacitance hinders accurate position sensing. Thus, various preferred embodiments of the present invention have been developed based on this discovery.

A display device according to a preferred embodiment of the present invention includes an active matrix substrate, a counter substrate, a display medium layer and a touch panel. The active matrix substrate has a plurality of pixel electrodes formed on one of the surfaces of the active matrix substrate and a switching element array electrically connected to the plurality of pixel electrodes. The counter substrate has a counter electrode facing the plurality of pixel electrodes. The counter substrate is thinner than the active matrix substrate. In other words, the active matrix substrate is thicker than the counter substrate. The display medium layer is arranged between the active matrix substrate and the counter substrate. The capacitive touch panel is arranged on the other surface of the active matrix substrate.

In the display device according to a preferred embodiment of the present invention, the capacitive touch panel and the counter electrode are relatively spaced from each other. As a result, large capacitance that hinders the position sensing is less likely to occur between the capacitive touch panel and the counter electrode. Therefore, the reduction of position sensing accuracy due to capacitive coupling between the touch panel and the counter electrode is effectively restrained.

When the capacitive touch panel is arranged on the active matrix substrate side of the display device, the capacitance is hardly generated between the touch panel and the counter electrode as described above. However, the capacitance may possibly be generated between the touch panel and the pixel electrodes formed on the active matrix substrate. In this connection, as the active matrix substrate is thicker than the counter substrate, the capacitance generated between the capacitive touch panel and conductive components such as the pixel electrodes formed on the active matrix substrate is smaller than the capacitance generated between the capacitive touch panel and the counter electrode when the capacitive touch panel is arranged on the counter substrate side of the display device. Therefore, according to the display device of a preferred embodiment of the present invention, the position sensing accuracy is enhanced as compared with the conventional display device in which the capacitive touch panel is arranged on the counter substrate side of the display panel.

If the capacitive touch panel is arranged on the side of the display panel close to the relatively thin counter substrate, the thin counter substrate may possibly be deformed when the touch panel is operated. If the counter substrate is deformed, the thickness of a cell of the liquid crystal layer arranged between the counter substrate and the active matrix substrate is varied, i.e., the cell gap becomes uneven, and irregular display may be resulted. According to the display device of a preferred embodiment of the present invention, the capacitive touch panel is arranged on the side close to the active matrix substrate. As the active matrix substrate has the switching elements and is thicker and mechanically stronger than the counter substrate, the cell gap of the liquid crystal layer is less likely to vary and the touch panel as well as the display device are less likely to be damaged even if pressure is applied to the active matrix substrate when the touch panel is operated.

In this description, the "display medium layer" is a layer which modulates its optical transmittance depending on a potential difference between electrodes facing each other (the pixel electrodes and the counter electrode) or a layer which spontaneously emits light in response to current flowing between the electrodes facing each other. Examples of the display medium layer include a liquid crystal layer, an inorganic or organic EL layer, a luminescent gas layer, an electrophoretic layer and an electrochromic layer.

The switching element array may be a thin film transistor (TFT) array or an MIM (metal-insulator-metal) array.

The capacitive touch panel may include a position sensing electrode arranged to at least overlap with the display medium layer when viewed in plan from the capacitive touch panel, a plurality of electrode terminals electrically connected to the position sensing electrode, a power source circuit for applying voltages of the same phase and potential to the plurality of electrode terminals and a current sensing circuit for sensing currents flowing in the plurality of electrode terminals. In this case, the position sensing electrode is preferably formed of transparent conductive oxide having relatively high electrical resistance such as indium tin oxide (ITO) and indium zinc oxide (IZO).

As the position sensing electrode is formed of the transparent conductive oxide, the electrical resistance of the position sensing electrode is relatively high. Therefore, a signal which is less likely to be influenced by parasitic resistance of an external circuit and highly sensitive to the touched location is obtained. Thus, the position sensing accuracy is enhanced to a greater extent.

If the position sensing electrode is formed of transparent conductive oxide having relatively high electrical resistance, the potential of the position sensing electrode is varied at reduced speed. As a result, if the capacitive touch panel is arranged on the counter substrate side, the potential of the position sensing electrode is significantly fluctuated due to the potential variation of the counter electrode. This makes it difficult to set the timing of when to detect position information. In contrast, if the capacitive touch panel is arranged on the active matrix substrate side according to a preferred embodiment of the present invention, the potential fluctuation of the position sensing electrode due to the potential variation of the counter electrode is effectively reduced. Thus, the position sensing accuracy is enhanced and the timing when to detect the position information is easily established.

The capacitive touch panel and the active matrix substrate may be arranged to be spaced from each other. In general, the capacitive touch panel and the active matrix substrate or the counter substrate are arranged to be in close contact without having a gap therebetween for the purpose of reducing the thickness of the display device as much as possible. However, it is difficult to bring the capacitive touch panel and the active matrix substrate or the counter substrate into completely close contact with each other and small gaps may be generated therebetween because a trace amount of air or foreign objects such as dust is trapped therebetween. In such a case, interference of light may occur depending on the size of the gaps and irregular display may be resulted such as moiré fringes. In contrast, since the capacitive touch panel and the active matrix substrate are arranged to be spaced from each other as described above, the irregular display such as the moiré fringes is restrained from occurring.

An optical film such as a polarizing plate may be arranged between the capacitive touch panel and the active matrix substrate.

The active matrix substrate and the capacitive touch panel may be integrated with each other.

The capacitive touch panel may allow only a certain polarized light to pass through. In other words, the capacitive touch panel may also function as a polarizing plate. With this configuration, there is no need of providing a separate polarizing plate and the display device is thinned down to a greater extent.

The active matrix substrate may include a plurality of electrode lines extending parallel to each other and electrically connected to the switching element array and the display device may be driven by line inversion. Alternatively, the display device may be driven by dot inversion. If the line inversion or dot inversion is applied, irregular display derived from the difference in applied voltage is reduced. The occurrence of the capacitance between the touch panel and the counter electrode is restrained even if the line inversion or dot inversion is applied. Therefore, high position sensing accuracy is achieved.

The line inversion may be source line inversion or gate line inversion. In the source line inversion, the polarity of a signal voltage is reversed every time after a single line is scanned. In the gate line inversion, the polarity of the signal voltage is reversed every single horizontal period (H).

In the dot inversion, the polarity of the signal voltage is reversed between adjacent dots (pixels).

These and other features, elements, steps, advantages, and characteristics of the present invention will be apparent from the following description of preferred embodiments with reference to the accompanying drawings.

DETAILED DESCRIPTION OF THE PREFERRED EMBODIMENTS

Hereinafter, preferred embodiments of the present invention will be described in detail with reference to the figures.

First Preferred Embodiment

Figure 1:
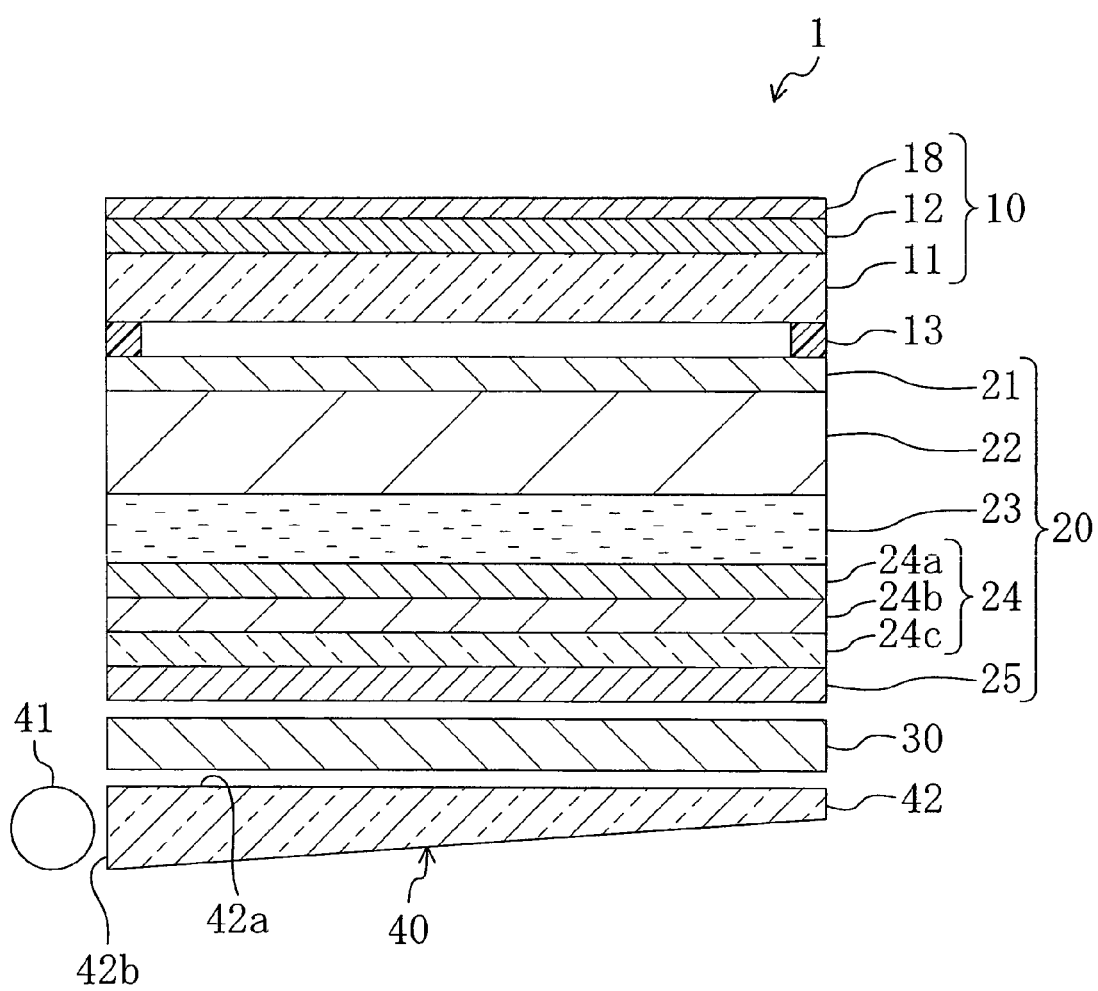
FIG. 1 is a sectional view of a liquid crystal display device according to a first preferred embodiment of the present invention.

FIG. 1 is a sectional view of a liquid crystal display device 1 according to a first embodiment of the present invention.

The liquid crystal display device 1 of the first preferred embodiment preferably includes a capacitive touch panel 10, a liquid crystal display panel 20, a diffusion sheet 30 and a backlight 40. The backlight 40 is arranged such that light from the backlight 40 enters the liquid crystal display panel 20 from the back. The diffusion sheet 30 is arranged between the backlight 40 and the liquid crystal display panel 20. The backlight 40 includes a light source 41 and a light guide plate 42. The light source 41 is arranged to face an end surface 42b of the light guide plate 42 such that light emitted from the light source 41 enters the light guide plate 42 via the end surface 42b of the light guide plate 42. Light entering the light guide plate 42 flows therein and emitted out of a principal surface 42a of the light guide plate 42 as almost uniform planar light. The diffusion sheet 30 further diffuses and equalizes the planar light emitted from the light guide plate 42.

The liquid crystal display panel 20 includes a first polarizing plate 25 arranged to face the diffusion sheet 30, a counter substrate 24 placed on the first polarizing plate 25, a liquid crystal layer 23 placed on the counter substrate 24, an active matrix substrate 22 placed on the liquid crystal layer 23 and a second polarizing plate 21 placed on the active matrix substrate 22.

The counter substrate 24 includes a first substrate body 24c, a color filter 24b placed on the first substrate body 24c and a counter electrode 24a placed on the color filter 24b.

Figure 2:
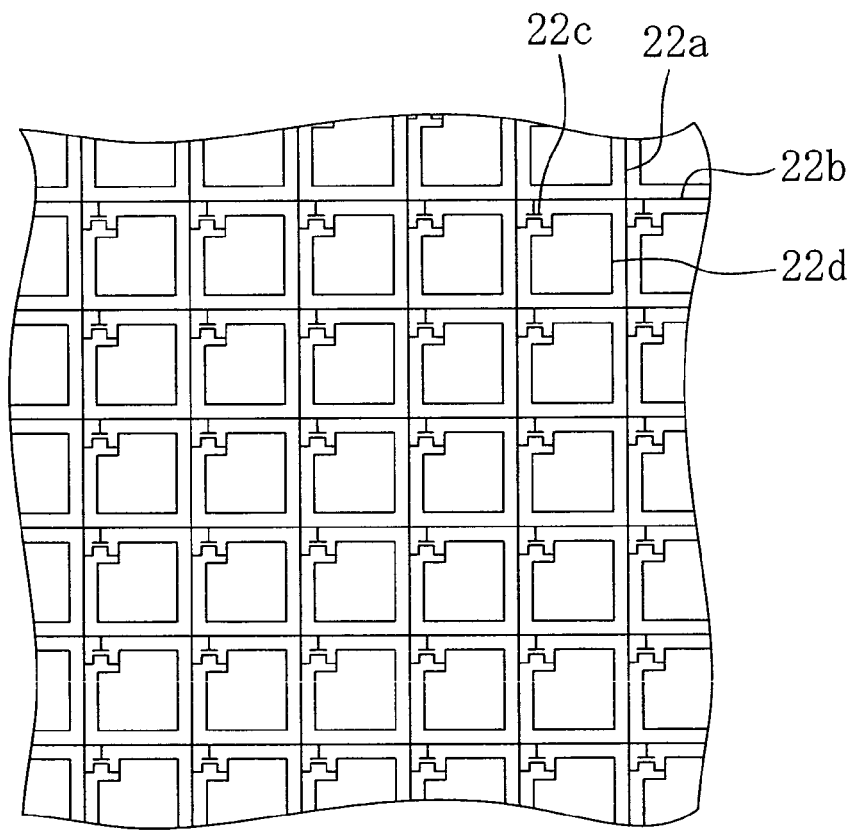
FIG. 2 is a schematic view illustrating the structure of an active matrix substrate.

FIG. 2 is a schematic view illustrating the structure of the active matrix substrate 22.

The active matrix substrate 22 includes a plurality of source lines 22a extending parallel to each other and a plurality of gate lines 22b extending parallel to each other and forming an angle (typically a right angle) with the extending direction of the source lines 22a. TFTs (thin film transistors) 22c are arranged at the intersections of the source lines 22a and the gate lines 22b as switching elements, respectively, and each of which is electrically connected to the corresponding source line 22a and gate line 22b. The TFTs 22c are arranged in a regular pattern (e.g., in a matrix pattern) to provide a switching element array (TFT array).

Pixel electrodes 22d are electrically connected to drain electrodes of the TFTs 22c, respectively. The pixel electrodes 22d and the counter electrode 24a apply a voltage to the liquid crystal layer 23 to drive and control the liquid crystal layer 23.

Figure 3:
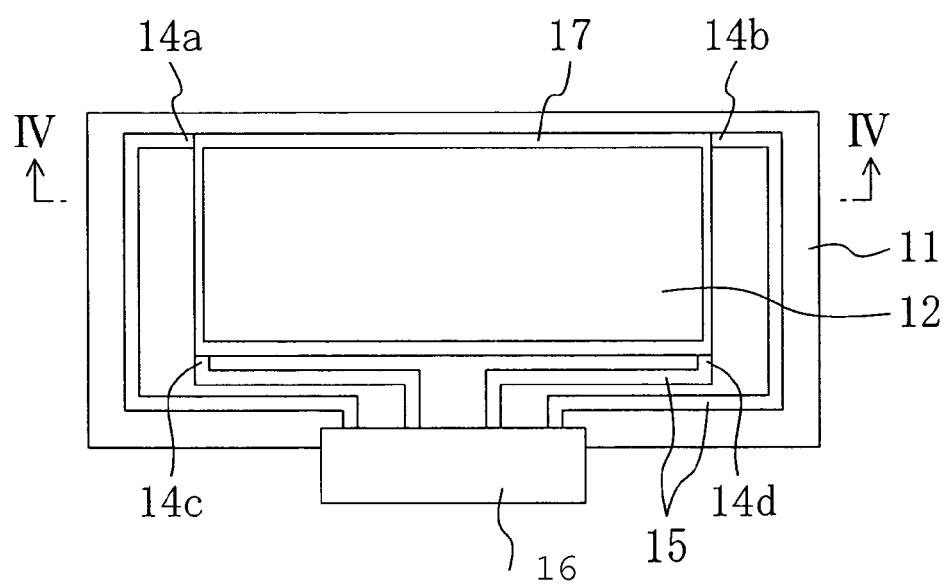
FIG. 3 is a schematic plan view illustrating the structure of a capacitive touch panel.

FIG. 3 is a schematic plan view illustrating the structure of the capacitive touch panel 10.

Figure 4:
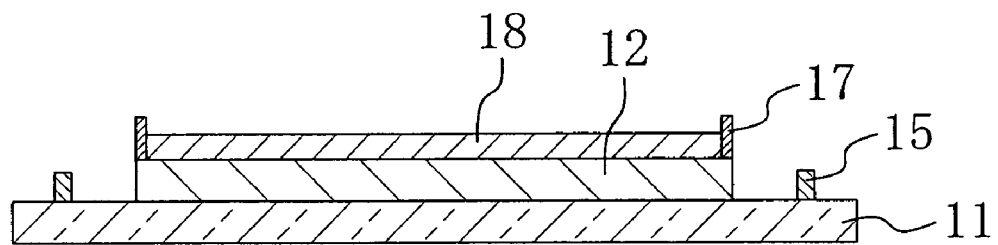
FIG. 4 is a sectional view taken along the line IV-IV of FIG. 3.

FIG. 4 is a sectional view taken along the line IV-IV of FIG. 3.

Figure 5:
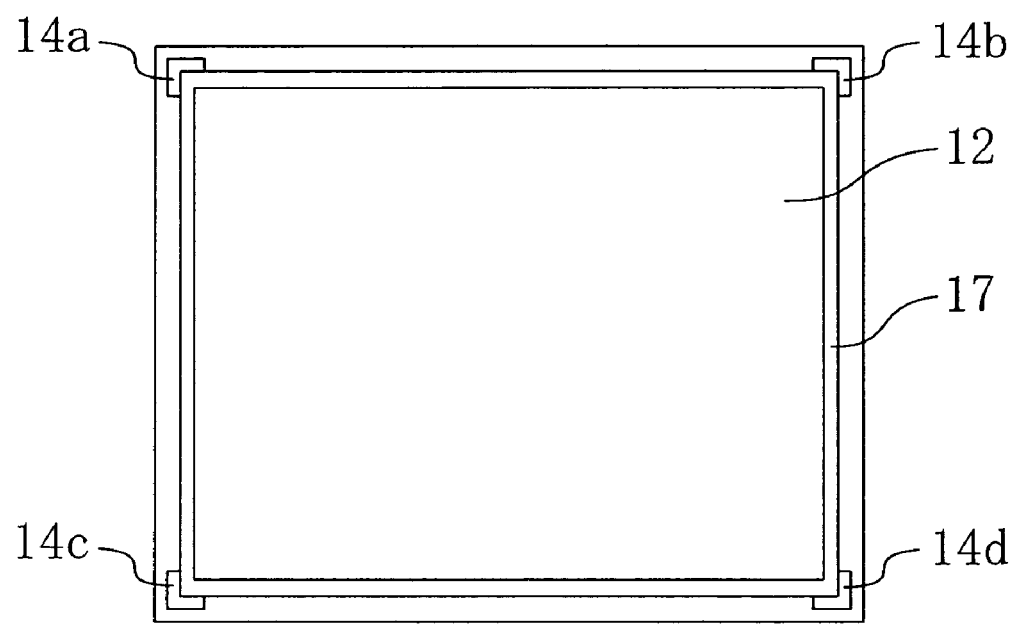
FIG. 5 is a schematic plan view illustrating the structure of a position sensing electrode and its vicinity.

FIG. 5 is a schematic plan view illustrating the structure of the position sensing electrode 12 and its vicinity.

The capacitive touch panel 10 includes an optically transparent second substrate body 11 made of glass or plastic, an optically transparent position sensing electrode 12 formed on the middle of the second substrate body 11 and an insulating layer 18 formed on the position sensing electrode 12 to cover the position sensing electrode 12. A frame 17 surrounds the periphery of the position sensing electrode 12. On the corners of the frame 17, electrode terminals 14 (14a, 14b, 14c and 14d) electrically connected to the position sensing electrode 12 are provided. An AC power supply circuit (not shown) is electrically connected to the electrode terminals 14a, 14b, 14c and 14d to apply voltages of the same phase and potential to them. The electrode terminals 14 are also electrically connected to wires 15 connected to a current sensing circuit 16.

The operation of the capacitive touch panel 10 will be explained with reference to the drawings.

When a stylus or a finger is not in contact with the capacitive touch panel 10, the electrode terminals 14a, 14b, 14c and 14d connected to the power supply circuit apply the same voltages to the position sensing electrode 12. Therefore, the position sensing electrode 12 is not energized. When the stylus or the finger touches the surface of the capacitive touch panel 10, i.e., the insulating layer 18 on the position sensing electrode 12, part of the position sensing electrode 12 corresponding to the touched part of the insulating layer 18 (hereinafter may be referred to as a contact part) is capacitively coupled with the ground via the insulating layer 18 and a user. Electrical resistance between the capacitively coupled contact part and each electrode terminal 14 electrically connected to the position sensing electrode 12 is proportional to a distance between the contact part and the electrode terminal 14. That is, current proportional to the distance between the contact part and each of the electrode terminals 14a, 14b, 14c and 14d flows in each of the electrode terminals 14a, 14b, 14c and 14d. For example, when the distance from the contact part to the electrode terminal 14a is greater than the distance from the contact part to the electrode terminal 14b, current flowing in the electrode terminal 14a is higher than that in the electrode terminal 14b. Therefore, the current sensing circuit 16 senses the currents flowing in the electrode terminals 14a, 14b, 14c and 14d, respectively, to detect the position of the contact part.

Figure 6:
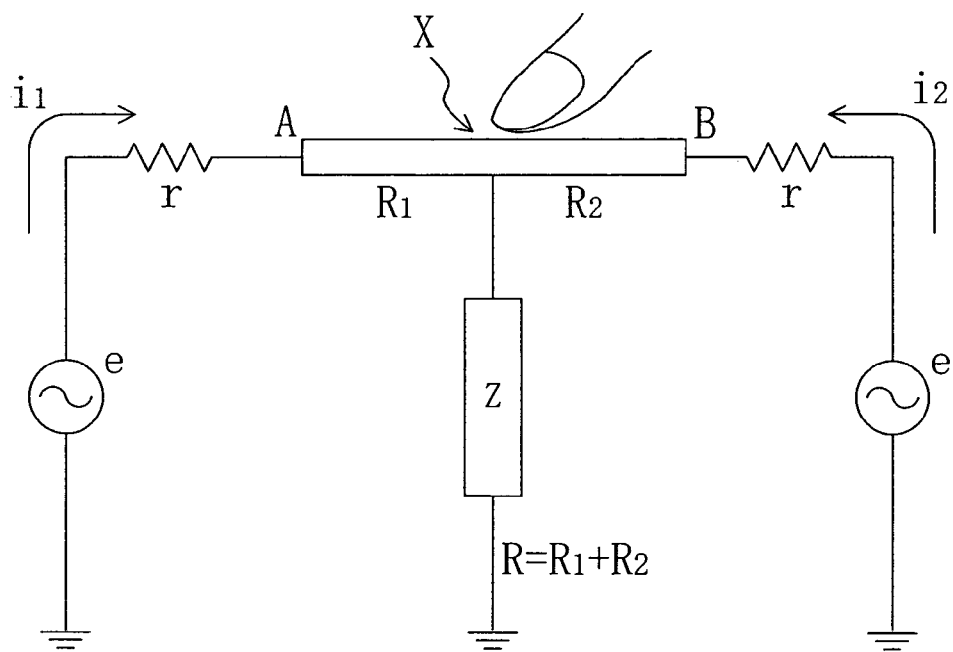
FIG. 6 is a diagram illustrating a basic principle of position sensing on the capacitive touch panel.
Figure 7:
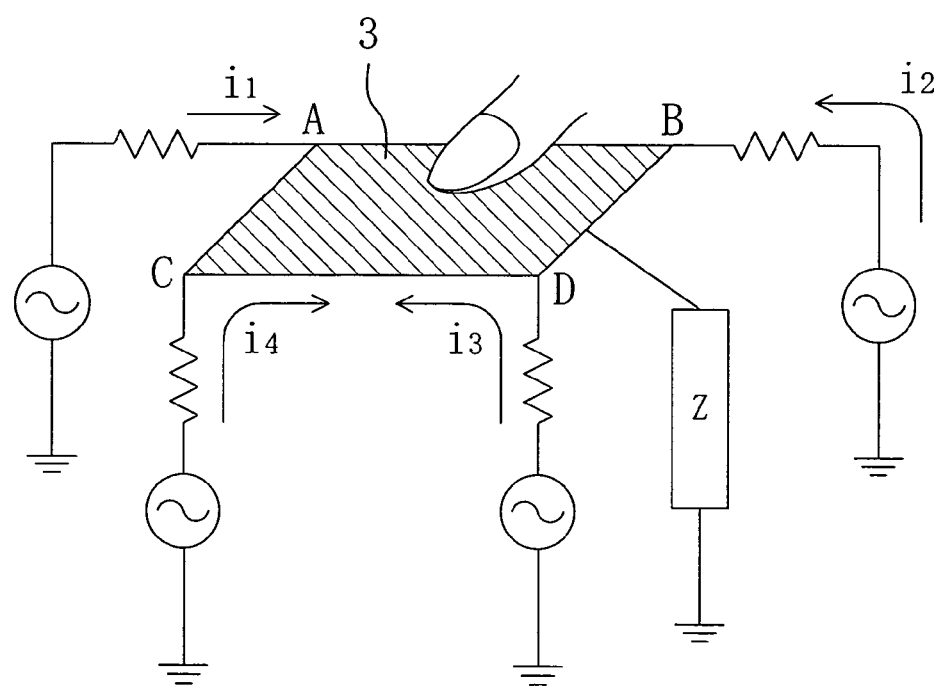
FIG. 7 is a diagram illustrating a basic principle of position sensing on the capacitive touch panel.

Referring to FIGS. 6 and 7, a basic principle of the position sensing on the capacitive touch panel 10 of the present preferred embodiment will be explained. For the sake of convenience, the position sensing on a line segment between the electrode terminals 14a and 14b will be explained first with reference to FIG. 6.

FIG. 6 shows one-dimensional resistance sandwiched between the electrode terminals 14a and 14b.

Each of the electrode terminals 14a and 14b is connected on one hand to the ground via resistance r for current-voltage conversion and an AC power supply circuit and on the other hand to the current sensing circuit 16 (not shown in FIG. 6).

The power supply circuit applies AC voltages (e) of the same phase and potential between the electrode terminal 14a and the ground and between the electrode terminal 14b and the ground. When the finger or the like is not in contact with the touch panel, current does not flow between the electrode terminals 14a and 14b because they have the same phase and potential.

Then, what happens when a location X is touched by the finger as shown in FIG. 6 is explained. It is assumed that resistance between the location X touched by the finger and the electrode terminal 14a is $R_1$, resistance between the location X and the electrode terminal 14b is $R_2$ and the sum of $R_1$ and $R_2$ is R. Regarding human impedance as Z, the current flowing in the electrode terminal 14a as $i_1$ and the current flowing to the electrode terminal 14b as $i_2$, the following equations 1 and 2 are provided.

$$e = ri_1 + R_1 i_1 + (i_1 + i_2)Z \quad \text{(equation 1)}$$

$$e = ri_2 + R_2 i_2 + (i_1 + i_2)Z \quad \text{(equation 2)}$$

The following equation 3 is obtained based on the equations 1 and 2. Further, modification of the equation 3 provides the following equation 4.

$$i_1(r + R_1) = i_2(r + R_2) \quad \text{(equation 3)}$$

$$i_2 = i_1(r + R_1)/(r + R_2) \quad \text{(equation 4)}$$

Substitution of the equation 4 into the equation 1 provides the following equation 5.

$$e = ri_1 + R_1 i_1 + (i_1 + i_1(r + R_1)/(r + R_2))Z \quad \text{(equation 5)}$$

$$= i_1(R(Z + r) + R_1 R_2 + 2Zr + r^2)/(r + R_2)$$

The following equations 6 and 7 are obtained based on the equation 5.

$$i_1 = e(r+R_2)/(R(Z+r)+R_1R_2+2Zr+r^2) \quad \text{(equation 6)}$$

$$i_2 = e(r+R_1)/(R(Z+r)+R_1R_2+2Zr+r^2) \quad \text{(equation 7)}$$

The following equation 8 represents the ratio of resistances $R_1$ and $R_2$ expressed by the total resistance R.

$$R_1/R = (2r/R+1)i_2/(i_1+i_2) - r/R \quad \text{(equation 8)}$$

As the resistances r and R are given, $R_1/R$ is calculated based on the equation 8 and values of the current $i_1$ flowing in the electrode terminal 14a and the current $i_2$ flowing in the electrode terminal 14b sensed by the current sensing circuit 16. The ratio $R_1/R$ is not dependent on the impedance Z of a person who touched the panel. Therefore, as long as the impedance Z is not zero or infinite, the equation 8 is obtained. Changes of state due to a person or material can be neglected.

The resistance R is preferably high from the aspect of obtaining high position sensing accuracy. That is, the position sensing electrode 12 is preferably a high resistance electrode. With the use of the high resistance position sensing electrode 12, the influence of parasitic resistance of an external circuit is reduced. Therefore, the position sensing electrode 12 is preferably made of transparent conductive oxide having higher electrical resistance than metal material such as aluminum. Examples of the transparent conductive oxide include, for example, indium tin oxide (ITO), indium zinc oxide (IZO) and tin oxide (SnO).

Next, referring to FIG. 7, a basic principle of the position sensing on two-dimensional resistance, i.e., on the actual capacitive touch panel 10, will be explained.

Each of the electrode terminals 14a, 14b, 14c and 14d is connected on one hand to the ground via resistance r for current-voltage conversion and an AC power supply circuit, and on the other hand to the current sensing circuit 16 (not shown in FIG. 7). The power supply circuit applies voltages of the same phase and potential to the electrode terminals 14a, 14b, 14c and 14d. In response to the touch of a stylus or a finger, currents $i_1$, $i_2$, $i_3$ and $i_4$ flow in the electrode terminals 14a, 14b, 14c and 14d, respectively. In this case, the following equations 9 and 10 are obtained by the above-described calculation.

$$X = k_1 + k_2 \cdot (i_2+i_3)/(i_2+i_2+i_3+i_4) \quad \text{(equation 9)}$$

$$Y = k_1 + k_2 \cdot (i_2+i_3)/(i_1+i_2+i_3+i_4) \quad \text{(equation 10)}$$

X is an X coordinate of a touched location on the position sensing electrode 12 and Y is a Y coordinate of the touched location on the position sensing electrode 12. Values $k_1$ and $k_2$ are offset and magnification, respectively and they are constants that do not depend on the human impedance.

Based on the equations 9 and 10, the touched location is calculated by the measurements of the currents $i_1$, $i_2$, $i_3$ and $i_4$ flowing in the electrode terminals 14a, 14b, 14c and 14d.

As described above, the capacitive touch panel senses a trace quantity of current that flows when a person touches the panel and determines the touched location based on the capacitance generated between the position sensing electrode 12 and a human finger. Therefore, capacitive coupling that is not derived from the touch of the finger has an adverse effect on the position sensing accuracy of the capacitive touch panel 10.

For example, when the capacitive touch panel is arranged on the counter substrate side of the display panel, capacitance is generated between the capacitive touch panel and the counter electrode arranged on the surface of the counter substrate facing the liquid crystal layer via the insulating counter substrate. The magnitude of the capacitance is correlated with the thickness of the counter substrate. Specifically, the thinner the counter substrate is, the greater capacitance is generated. Therefore, large capacitance that hinders the position sensing is generated between the capacitive touch panel and the counter electrode and the position sensing accuracy of the capacitive touch panel is decreased.

When a so-called line inversion is applied to drive the display device, i.e., the polarity of a counter electrode signal is reversed periodically every time a single scanning line is selected, the position sensing accuracy is significantly decreased. This is because the polarity inversion of the counter electrode involves charge exchange between the counter electrode and the position sensing transparent electrode and the potential of the position sensing transparent electrode is not stabilized.

If the position sensing is performed in such a manner that a certain voltage is preliminarily applied to the electrode of the touch panel and slight change of voltage upon the touch of the finger is amplified by an external amplifier to detect the amplified change, potential variation of the counter electrode, if it happens, may possibly be amplified to saturate the position sensing signal. The saturation of the position sensing signal can be reduced to a certain degree by adjusting the timing when to detect the voltage. However, if the counter electrode is a high resistance electrode, it is difficult to avoid the saturation of the position sensing signal even if the timing of voltage detection is adjusted.

According to the liquid crystal display device 1 of the first embodiment, the capacitive touch panel 10 is arranged on the side close to the active matrix substrate 22. Therefore, the capacitive touch panel 10 (more specifically, the position sensing electrode 12) is spaced away from the counter electrode 24a formed on the counter substrate 24. In addition, conductive components such as the pixel electrodes 22d are interposed between the capacitive touch panel 10 and the counter electrode 24a. Therefore, large capacitance will not be generated between the capacitive touch panel 10 and the counter electrode 24a. As a result, the decrease of the position sensing accuracy derived from the capacitance between the capacitive touch panel 10 and the counter electrode 24a is effectively prevented.

When the capacitive touch panel 10 is arranged on the side close to the active matrix substrate 22, capacitance is hardly generated between the touch panel 10 and the counter electrode 24a as described above. Instead, the capacitance may be generated between the touch panel 10 and the pixel electrodes 22d formed on the active matrix substrate 22. As the active matrix substrate 22 is thicker than the counter substrate 24, the capacitance generated between the capacitive touch panel 10 and the conductive components such as the pixel electrodes 22d formed on the active matrix substrate 22 is considerably smaller than the capacitance generated between the capacitive touch panel 10 and the counter electrode 24a when the touch panel 10 is arranged on the side close to the counter substrate 24. Therefore, the capacitance generated between the touch panel 10 and the conductive components formed on the active matrix substrate 22 such as the pixel electrodes 22d does not cause significant decrease of the position sensing accuracy.

Thus, the liquid crystal display device 1 according to the first preferred embodiment makes it possible to achieve high position sensing accuracy.

For example, when the capacitive touch panel 10 is arranged on the side close to the counter substrate 24 which is relatively thin, the thin counter substrate 24 may be deformed or damaged due to the pressure applied thereto when the touch panel is operated. When the counter substrate 24 is deformed, the thickness of a cell of the liquid crystal layer 23 arranged between the counter substrate 24 and the active matrix substrate 22 is varied, i.e., the cell gap becomes uneven, and irregular display may be resulted. According to the liquid crystal display device 1 of the first preferred embodiment, in contrast, the capacitive touch panel 10 is arranged on the side close to the active matrix substrate 22. As the active matrix substrate 22 is relatively thick and has high mechanical strength, the active matrix substrate 22 is less likely to be deformed even if pressure is applied to the active matrix substrate 22 when the touch panel is operated. Therefore, the cell gap of the liquid crystal layer 23 is less likely to vary. Thus, image display is achieved with reduced irregularity even during the operation of the capacitive touch panel 10.

In the liquid crystal display device 1 according to the first preferred embodiment, the capacitive touch panel 10 and the active matrix substrate 22 are arranged to be spaced from each other. More specifically, the capacitive touch panel 10 and the liquid crystal display panel 20 are arranged with an air layer interposed therebetween and the periphery of the capacitive touch panel 10 is adhered to the liquid crystal display panel 20 by an adhesive layer 13.

From the viewpoint of thinning the liquid crystal display device 1 as much as possible, the capacitive touch panel 10 is preferably arranged to be in close contact with the liquid crystal display panel 20. However, if the capacitive touch panel 10 is brought into close contact with the liquid crystal display panel 20, a trace amount of air or dust may be trapped between the capacitive touch panel 10 and the liquid crystal display panel 20 in the manufacture of the liquid crystal display device 1, in particular, when the capacitive touch panel 10 is mounted on the liquid crystal display panel 20. If the dust or the like is trapped between the capacitive touch panel 10 and the liquid crystal display panel 20, a small gap may be generated between the capacitive touch panel 10 and the liquid crystal display panel 20. Depending on the size of the gap, interference of light may occur to bring about irregular display such as moiré fringes.

In this connection, the capacitive touch panel 10 and the liquid crystal display panel 20 of the present preferred embodiment are arranged to have a gap therebetween in advance. Therefore, the irregular display such as the moiré fringes is effectively prevented from occurring.

For example, if the idea of arranging the capacitive touch panel 10 and the liquid crystal display panel 20 to be spaced from each other is applied to a liquid crystal display device in which the capacitive touch panel 10 is arranged on the counter substrate side of the display panel, the touch panel is sagged by the finger or stylus used to operate the touch panel and the load of the finger or stylus is concentrated on a certain point on the thin counter substrate. If the counter substrate is thin, the load is not effectively dispersed in the surface direction and the load applied onto the counter substrate is transmitted and concentrated onto a certain point on the liquid crystal layer. Therefore, the cell gap tends to vary. If the applied load is large, the cell gap of the liquid crystal layer is irreversibly varied and irregular display may constantly occur. Worse still, the counter substrate may be damaged.

From the viewpoint of reducing the possibility of irregular display such as the moiré fringes caused by the gap between the capacitive touch panel 10 and the liquid crystal display panel 20, the capacitive touch panel 10 and the liquid crystal display panel 20 are arranged to be spaced from each other. However, if the capacitive touch panel 10 and the liquid crystal display panel 20 are arranged to be spaced from each other, the cell gap is likely to vary when the touch panel is operated. For this reason, in particular when the touch panel is arranged to be spaced from the liquid crystal display panel, the touch panel is preferably arranged on the side close to the active matrix substrate 22 which is relatively thick and highly durable as mentioned in the first preferred embodiment. With the capacitive touch panel 10 arranged close to the active matrix substrate 22 of the liquid crystal display panel 20 to be spaced from the liquid crystal display panel 20, irregular display caused by the variation of the cell gap when the touch panel is operated, as well as irregular display caused by interference of light generated between the capacitive touch panel 10 and the liquid crystal display panel 20, such as moiré fringes, are restrained from occurring.

If the capacitive touch panel 10 is arranged on the side close to the active matrix substrate 22, there is no need of considering the pressure applied onto the counter substrate 24 when the touch panel is operated. Specifically, different from the case where the pressure is applied from the counter substrate 24 side, the counter substrate 24 is not required to have relatively high mechanical durability. Therefore, the counter substrate 24 can be thinned down to a greater extent. As a result, the thickness of the liquid crystal display device 1 can further be reduced.

In the first preferred embodiment, the method of driving the liquid crystal display panel 20 is not particularly limited. For example, the liquid crystal display panel 20 may be driven by line inversion (source line inversion and gate line inversion), dot inversion and the like. Preferably, the liquid crystal display panel 20 is driven by the source line inversion or dot line inversion. When the touch panel is arranged on the side close to the counter substrate and the display panel is driven by the line inversion or dot inversion, large capacitance is generated between the counter electrode and the position sensing electrode of the touch panel and the position sensing accuracy is decreased. In contrast, when the capacitive touch panel 10 is arranged on the side close to the active matrix substrate 22 as described in the first preferred embodiment, the large capacitance is not generated between the counter electrode 24a and the position sensing electrode 12 of the capacitive touch panel 10. Further, the capacitance generated between the touch panel 10 and the pixel electrodes 22d formed on the active matrix substrate 22 is smaller than the capacitance generated between the touch panel 10 and the counter electrode 24a when the touch panel 10 is arranged on the side close to the counter substrate 24. Thus, the position sensing accuracy is less likely to be decreased.

If the gate line inversion is applied and a voltage is maintained at the pixel electrode 22d while the TFT 22c is off, the potential of the pixel electrode 22d is fluctuated in the same manner as the potential of the counter electrode 24a driven by AC current. Therefore, the position sensing electrode 12 of the touch panel 10 is influenced by the potential of the pixel electrode 22d fluctuated by the AC current and the position sensing accuracy may possibly deteriorate. On the other hand, when the source line inversion is applied, the counter electrode 24a is driven by direct current. Therefore, the potential of the pixel electrodes 22d is not fluctuated. Even if the line inversion is applied to drive the potential of the counter electrode 24a by DC, potential is written in at least a set of pixel electrodes 22d aligned along the same scanning line while polarity reversal occurs at all times. Although the occurrence of noise due to sequential driving along the lines is a concern, charge exchange between adjacent pixel electrodes 22d is canceled if the display device is driven by the source line inversion or dot inversion in which adjacent pixel electrodes 22d shows different polarities. As a result, the position sensing accuracy is enhanced to a greater extent.

Modified Preferred Embodiment

In the first preferred embodiment, the electrode terminals 14 are provided at the four corners of the position sensing electrode 12. However, the present invention is not limited thereto. When the position sensing is performed only in the one dimensional manner, the number of the electrode terminals 14 may be reduced to two. For the two dimensional position sensing, the required number of the electrode terminals 14 is at least three. Five or more electrode terminals 14 may be arranged. The larger the number of the electrode terminals 14 is, the higher the position sensing accuracy will be.

Second Preferred Embodiment

Figure 8:
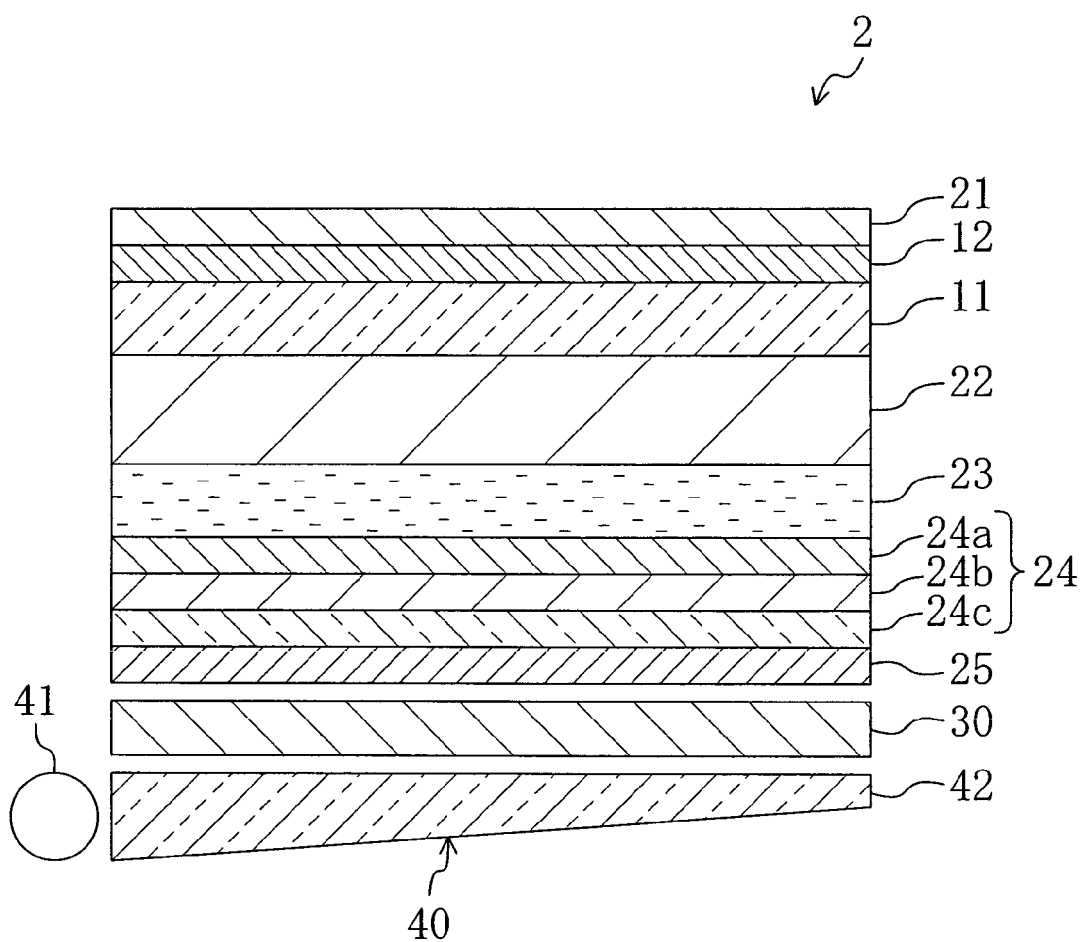
FIG. 8 is a sectional view illustrating a liquid crystal display device 2 of a second preferred embodiment of the present invention.

FIG. 8 is a sectional view illustrating a liquid crystal display device 2 according to a second preferred embodiment of the present invention.

The liquid crystal display device 2 of the second preferred embodiment is different from the liquid crystal display device 1 of the first preferred embodiment in that the capacitive touch panel 10 is integrated with the active matrix substrate 22. Other than the difference, the liquid crystal display device 2 is configured in the same manner as that of the first preferred embodiment and the obtained effect is also the same. In the explanation of the second preferred embodiment, components that function in substantially the same manner as those of the first preferred embodiment will be indicated by the same reference numerals to omit the explanation.

According to the second preferred embodiment, the capacitive touch panel 10 is integrated with the active matrix substrate 22. More specifically, the second substrate body 11 used as a substrate for the touch panel is arranged to be close contact with the surface of the active matrix substrate 22 opposite the liquid crystal layer 23 and the position sensing electrode 12 and the second polarizing plate 21 are stacked on the surface of the second substrate body 11. As the highly flat glass substrates are brought into close contact, a trace amount of air is not trapped therebetween and moiré fringes caused by interference of light is prevented from occurring. Further, the liquid crystal display panel 20 and the capacitive touch panel 10 are handled as a one-piece assembly. Therefore, they are transported easily in the manufacturing process and failure during the process is less likely to occur. According to the second preferred embodiment, the insulating layer 18 is omitted because the second polarizing plate 21 also functions as the insulating layer 18. Therefore, the cost for fabricating the insulating layer 18 is saved and the manufacturing cost is effectively reduced.

Modified Preferred Embodiment

Figure 9:
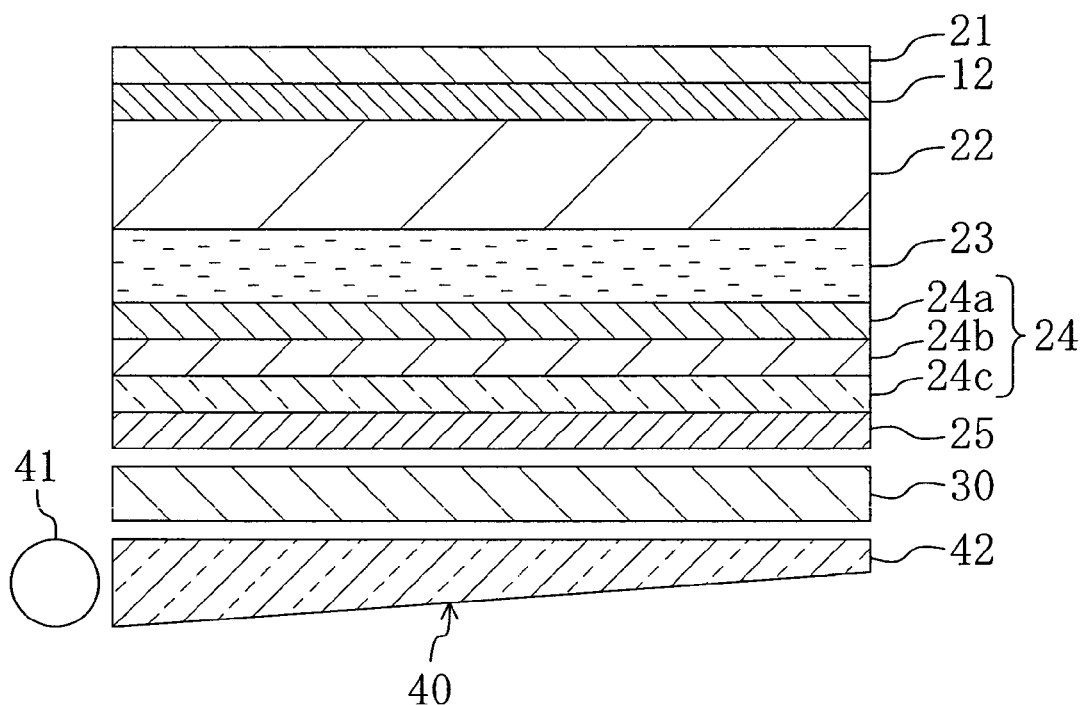
FIG. 9 is a sectional view illustrating a liquid crystal display device of a modified preferred embodiment of the present invention.

FIG. 9 is a sectional view of a liquid crystal display device of a modified preferred embodiment.

According to the modified preferred embodiment, the touch panel (position sensing electrode 12) is not formed on an individual substrate exclusive for the touch panel (second substrate body 11), but formed directly on the active matrix substrate 22. With this configuration, the touch panel liquid crystal display device is further reduced in thickness and weight. Further, since the step of bonding the liquid crystal display panel 20 and the capacitive touch panel 10 is no longer necessary, the manufacturing cost is reduced, a trace amount of air is not trapped and the moiré fringes caused by interference of light is prevented. In addition, the cost of the substrate for the touch panel (second substrate body 11) is saved.

Also in the modified preferred embodiment, the touch panel 10 is arranged on the side close to the relatively thick active matrix substrate 22. Therefore, as described in the first and second preferred embodiments, the capacitance generated between the touch panel 10 and the other conductive components is reduced and the position sensing accuracy is enhanced.

Third Preferred Embodiment

Figure 10:
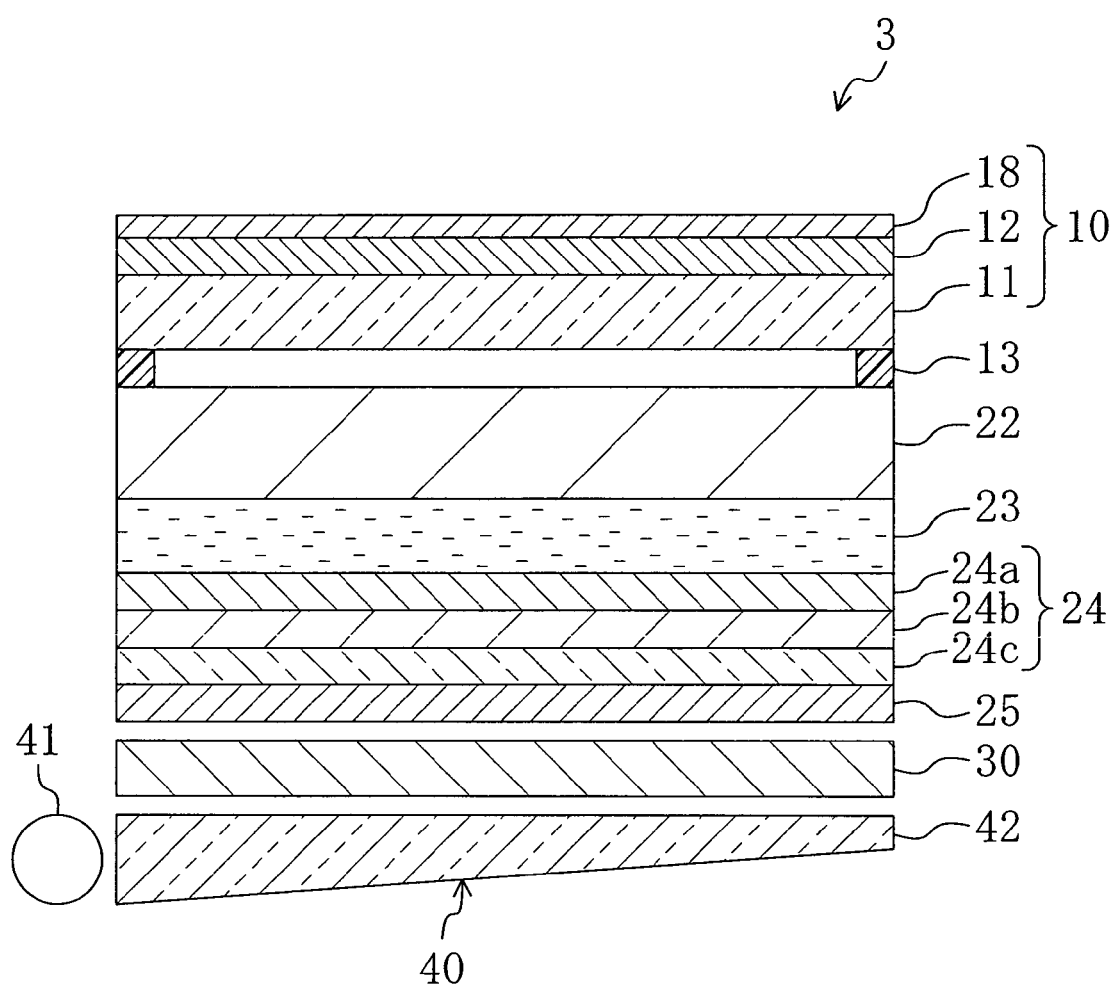
FIG. 10 is a sectional view illustrating a liquid crystal display device of a third embodiment of the present invention.

FIG. 10 is a sectional view of a liquid crystal display device 3 according to a third preferred embodiment of the present invention.

The liquid crystal display device 3 of the third preferred embodiment is different from the liquid crystal display device 1 of the first preferred embodiment in that the capacitive touch panel 10 also functions as a polarizing plate. Other than this difference, the liquid crystal display device 3 is configured in the same manner as that of the first preferred embodiment the obtained effect is also the same. In the explanation of the third preferred embodiment, components that function in substantially the same manner as those of the first preferred embodiment will be indicated by the same reference numerals to omit the explanation.

In the third preferred embodiment, the capacitive touch panel 10, more specifically the second substrate body 11, functions as a polarizing plate which allows only a certain polarized light to pass through. The capacitive touch panel 10 is directly bonded to the active matrix substrate 22 without any polarizing plate interposed therebetween. With this configuration, there is no need of placing the separate polarizing plate on the active matrix substrate 22 and the display device is further reduced in thickness and weight.

As described above, the display device according to various preferred embodiments of the present invention has high position sensing accuracy and is useful for cellular phones, PDAs, television sets, electronic books, monitors and watches.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
    an active matrix substrate including a plurality of pixel electrodes located at a first surface of the active matrix substrate and a switching element array electrically connected to the plurality of pixel electrodes;
    a counter substrate including a counter electrode located at a surface of the counter substrate, the surface of the counter substrate being arranged to face the plurality of pixel electrodes, the counter substrate being thinner than the active matrix substrate;
    a display medium layer arranged between the active matrix substrate and the counter substrate; and
    a capacitive touch panel arranged on a second surface of the active matrix substrate that is opposite to the first surface.

2. The display device of claim 1, wherein the capacitive touch panel includes a position sensing electrode arranged to overlap at least with the display medium layer when viewed in plan from the capacitive touch panel, a plurality of electrode terminals electrically connected to the position sensing electrode, a power source circuit arranged to apply voltages of the same phase and potential to the plurality of electrode terminals and a current sensing circuit arranged to sense currents flowing in the plurality of electrode terminals.

3. The display device of claim 2, wherein the position sensing electrode is substantially made of transparent conductive oxide.

4. The display device of claim 1, wherein the capacitive touch panel and the active matrix substrate are arranged to be spaced from each other.

5. The display device of claim 1, wherein the active matrix substrate and the capacitive touch panel are integrated with each other.

6. The display device of claim 1, wherein the capacitive touch panel allows only a certain polarized light to pass through.

7. The display device of claim 1, wherein the active matrix substrate includes a plurality electrode lines extending substantially parallel to each other and electrically connected to the switching element array, and the display device is driven by line inversion.

8. The display device of claim 1, wherein the display device is driven by dot inversion.

9. The display device of claim 1, wherein the display medium layer is a liquid crystal layer.

* * * * *